(12) United States Patent
Yu et al.

(10) Patent No.: US 11,702,176 B2
(45) Date of Patent: Jul. 18, 2023

(54) DEVICE FOR REPAIRING DEEP-WATER CAGE NETS

(71) Applicant: Guangdong Ocean University, Zhanjiang (CN)

(72) Inventors: Guoyan Yu, Zhanjiang (CN); Zejia Chen, Zhanjiang (CN); Zhuoheng Li, Zhanjiang (CN); Shuaixing Chen, Zhanjiang (CN); Yijun Liang, Zhanjiang (CN); Zhaoji Guan, Zhanjiang (CN); Jiancheng Xu, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/966,972

(22) Filed: Oct. 17, 2022

(65) Prior Publication Data

US 2023/0125682 A1 Apr. 27, 2023

(30) Foreign Application Priority Data

Oct. 21, 2021 (CN) .......................... 202111224678.4

(51) Int. Cl.
  *B63C 11/52* (2006.01)
  *B21F 11/00* (2006.01)
  *B21F 23/00* (2006.01)
(52) U.S. Cl.
  CPC .............. *B63C 11/52* (2013.01); *B21F 11/00* (2013.01); *B21F 23/00* (2013.01)

(58) Field of Classification Search
  CPC ............ B63C 11/52; B21F 11/00; B21F 23/00
  See application file for complete search history.

(56) References Cited

U.S. PATENT DOCUMENTS

2002/0104353 A1* 8/2002 Hresc ..................... B21F 3/02
72/129

FOREIGN PATENT DOCUMENTS

| CN | 203652095 U | 6/2014 |
| CN | 104438979 A | 3/2015 |
| CN | 110696015 A | 1/2020 |
| CN | 210298603 U | 4/2020 |
| CN | 112572737 A | 3/2021 |
| CN | 112591056 A | 4/2021 |

(Continued)

*Primary Examiner* — Stephen P Avila
(74) *Attorney, Agent, or Firm* — Stuart H. Mayer; Mayer & Williams PC

(57) ABSTRACT

Disclosed is a device for repairing deep-water cage nets. The device includes an open-frame underwater robot and a repairing mechanism of deep-water cage nets, where the repairing mechanism of deep-water cage nets includes a hole penetrating mechanism, a wire feeding mechanism, a rotary knotting mechanism, a steel wire cutting mechanism and steel wire clamping mechanisms. The hole penetrating mechanism comprises mechanical claws and a control box for controlling the mechanical claws. The wire feeding mechanism and the steel wire cutting mechanism are both fixedly arranged in the control box, and the steel wire clamping mechanisms and the rotary knotting mechanism are both arranged between two mechanical claws. The open-frame underwater robot is detachably connected with the repairing mechanism of deep-water cage nets through a connecting shaft.

9 Claims, 12 Drawing Sheets

(56) References Cited

FOREIGN PATENT DOCUMENTS

| | | |
|---|---|---|
| CN | 213603849 U | 7/2021 |
| CN | 113830271 A | 12/2021 |
| JP | H02307951 A | 12/1990 |
| JP | H0870729 A | 3/1996 |
| JP | 2003212186 A | 7/2003 |

\* cited by examiner

DEVICE FOR REPAIRING DEEP-WATER CAGE NETS

CROSS-REFERENCE TO RELATED APPLICATIONS

This application claims priority to Chinese Patent Application No. 202111224678.4, filed on Oct. 21, 2021, the contents of which are hereby incorporated by reference.

TECHNICAL FIELD

The application relates to the technical field of marine fishery, and in particular to a device for repairing deep-water cage nets.

BACKGROUND

Marine fishery refers to the production undertaking of marine fishing and mariculture. Deep-water cage culture is mainly in the harsh underwater environment far away from the land. Under the combined influence of natural factors and biological factors such as wind and waves and undercurrent, deep-water cage nets are easily damaged. The escape of a large number of fish brings great economic losses and causes ecological environmental pollution in this sea area. However, conventional repair of cage nets mainly depends on manual repairing, while the complex seabed environment, high risk factors and the limitation of human body function make the cage net repair s efficiency and quality low. Therefore, it is an urgent need to have a device for repairing holes in deep-water cage nets.

SUMMARY

The objective of the present application is to provide a device for repairing deep-water cage nets, so as to solve the problems existing in the prior art, repair holes of deep-water cage nets, and improve the efficiency of repairing the holes of deep-water cage nets.

In order to achieve the above objective, the application provides the following scheme.

A device for repairing deep-water cage nets is provided in the application and comprises an open-frame underwater robot and a repairing mechanism of deep-water cage nets; the repairing mechanism of deep-water cage nets includes a hole penetrating mechanism, a wire feeding mechanism, a rotary knotting mechanism, a steel wire cutting mechanism and steel wire clamping mechanisms.

The hole penetrating mechanism includes mechanical claws and a control box for controlling the mechanical claws. The wire feeding mechanism and the steel wire cutting mechanism are both fixedly arranged in the control box, and the steel wire clamping mechanisms and the rotary knotting mechanism are both arranged between two mechanical claws.

The open-frame underwater robot is detachably connected with the repairing mechanism of deep-water cage nets through a connecting shaft.

Deep-water cage nets with holes are effectively repaired through a cooperation between the open-frame underwater robot and the repairing mechanism of deep-water cage nets. Moreover, the open-frame underwater robot well overcomes the complex environment of the seabed and reduce risks when the robot is working, so that the device for repairing effectively replaces a conventional manual launching repairing mode, improves the repairing efficiency and ensures the personnel safety. Secondly, in the application, modular assembly is used to assemble the open-frame underwater robot and the repairing mechanism of deep-water cage nets, which is not only convenient to disassemble and assemble the open-frame underwater robot and the repairing mechanism of deep-water cage nets, but also beneficial to transport the open-frame underwater robot and the repairing mechanism of deep-water cage nets, thus ensuring the safety of the device. In addition, according to the application, net repairing and knotting are organically combined, which not only speeds up the repairing efficiency, but also reduces parts of the repairing mechanism of the deep-water cage nets, shortens the time for manufacturing the device, and improves the practicability of the device.

Optionally, there are two mechanical claws, the two mechanical claws respectively penetrate through a box body of the control box, and inner sides of mechanical claws are provided with U-shaped grooves. The mechanical claws are L-shaped, and a cross-sectional diameter of the U-shaped groove on each mechanical claw is slightly larger than that of a steel wire. A side wall of the control box intersecting with the mechanical claws is provided with a groove for two mechanical claws to penetrate through the side wall of the box body of the control box, and a length of the groove is slightly smaller than that of the side wall of the control box, so as to provide enough space for the two mechanical claws to move, repair holes with different areas and improve the practicability of the device.

The two mechanical claws are a first mechanical claw and a second mechanical claw respectively, a lever arm of the first mechanical claw located inside the control box is fixedly connected with a first sector gear, the first sector gear is meshed with a second sector gear, a lever arm of the second mechanical claw located inside the control box is fixedly connected with a third sector gear, and the second sector gear and the third sector gear are mutually meshed. The first sector gear is fixedly connected with a fully waterproof steering gear, the fully waterproof steering gear is fixedly connected to the inner wall of the control box. A tail of each mechanical claw is a horizontal V-shaped bracket, and each horizontal V-shaped bracket is sleeved on their respective fixing column inside the control box to stabilize the mechanical claws, so that the mechanical claws can rotate along their respective fixing column. The first mechanical claw and the second mechanical claw are respectively connected with their respective fixing column, and fixing columns penetrate through holes near middle positions of mechanical claws, and are fixedly connected with side faces of the second sector gear and the third sector gear respectively at the end positions of the lever arms of mechanical claws. Because the second sector gear and the third sector gear are meshed with each other, when the first sector gear is engaged with the other two sector gears to drive, the first mechanical claw and the second mechanical claw are close to each other or far away, thus improving the intelligence of the device. The first sector gear, the second sector gear and the third sector gear are all arranged near a top of the box body of the control box and are located in a same plane. The first sector gear is driven only by controlling the first fully waterproof steering gear to rotate back and forth.

Optionally, the second sector gear and the third sector gear have a same shape and are symmetrical about a center line of the control box, and an arc angle of the third sector gear is smaller than that of the first sector gear.

Optionally, the wire feeding mechanism comprises a steel wire shaft and a steel wire wound on the steel wire shaft, where one side of the steel wire shaft is provided with a first submersible motor. The first submersible motor is fixedly connected with an inside of the control box, the first submersible motor is coaxially and fixedly connected with a first wire feeding gear, the first wire feeding gear is in close contact with the steel wire, the first wire feeding gear is meshed with a second wire feeding gear, the second wire feeding gear is meshed with a third wire feeding gear and the second wire feeding gear and the third wire feeding gear are located on both sides of the steel wire and are symmetrically arranged with respect to the steel wire. The steel wire is made of stainless steel, which ensures that repaired nets are firmer. The specifications of the three wire feeding gears are the same, a middle part of each wire feeding gear is provided with a groove along the circumferential direction of the gear itself, a shape of each groove is matched with that of the steel wire, and when each groove is in use, a running direction of the steel wire is effectively controlled, and the second wire feeding gear is correspondingly arranged with the first wire feeding gear and the second wire feeding gear and the first wire feeding gear are closely meshed with each other, so that the steel wire is tightly clamped by an extrusion force of engagement between the two gears and pulled out along with a rotation of the gears, thereby realizing fast wire discharging and improving the practicability of the device. Moreover, the second wire feeding gear and the third wire feeding gear press a bent part of the steel wire straight, thus ensuring that the steel wire is not stuck when being pulled out.

Optionally, the rotary knotting mechanism includes a second submersible motor and a rotating shaft, a first cylindric straight-teeth gear connected to the second submersible motor, and a second cylindric straight-teeth gear connected to the rotating shaft, where the first cylindric straight-teeth gear and the second cylindric straight-teeth gear are meshed with each other, the second submersible motor is meshed with the rotating shaft through two groups of straight-teeth gears, and one side of the rotating shaft far away from the second submersible motor is fixedly connected with an intercepting plate. Two ends of the intercepting plate are provided with through holes for threading the steel wire, the intercepting plate is located outside the control box and between the mechanical claws, the through holes correspond to cross sections of the U-shaped grooves, and the mechanical claws are provided with grooves for the intercepting plate to move. When knotting is needed, the second submersible motor drives the intercepting plate to rotate and tighten the two disconnected steel wires. The intercepting plate is arranged near ends of the mechanical claws to ensure that a tightening part of the steel wires is not too long, which not only saves the steel wire, but also prevents a knotting part from being too large to affect the survival of fish.

Optionally, the steel wire cutting mechanism is fixedly arranged at one side of the wire feeding mechanism in a wire outlet direction, and the steel wire cutting mechanism comprises a fixed plate fixedly connected with the inner wall of the control box, and the fixed plate is fixedly connected with a second fully waterproof steering gear, the second fully waterproof steering gear is coaxially and fixedly connected with a first straight-teeth gear, the first straight-teeth gear is meshed with a second straight-teeth gear, the second straight-teeth gear is connected to the fixed plate through a fixed rod, and blades are fixedly connected to the first straight-teeth gear and the second straight-teeth gear respectively. Two blades are hinged with each other and are matched with each other. The steel wire cutting mechanism is arranged close to the second wire feeding gear, which cuts the steel wire from a root of the second wire feeding gear when a wire feeding is stopped, so as to prevent excessive wire from being pulled out by the intercepting plate during knotting, resulting in a waste of the wire. Moreover, a broken steel wire at one end of the steel wire cutting mechanism far away from the wire feeding gears is also be used for knotting, so that the steel wire is effectively utilized efficiently and unnecessary waste is avoided.

Optionally, there are two sets of steel wire clamping mechanisms, the two sets of steel wire clamping mechanisms are symmetrically arranged about the center line of the control box, and both sets of steel wire clamping mechanisms are arranged on a bottom plate, and each set of steel wire clamping mechanisms comprises a sealing protective shell, and one side of an inside of the sealing protective shell close to the bottom plate is fixedly connected with a mini steering gear. The mini steering gear is coaxially and fixedly connected with a first gear, the first gear is meshed with a second gear, the second gear is meshed with a third gear, and the third gear and the second gear are longitudinally arranged in parallel. The third gear and the second gear are both fixedly connected with serrated racks, and serrations on the two groups of serrated racks are correspondingly arranged. Ends of the two groups of serrated racks correspond to the U-shaped grooves. The mechanical claws are provided with grooves for the serrated racks to move. By driving the mini steering gear, the first gear is driven, and the first gear meshes with the second gear, the second gear meshes with the third gear, and then drives the serrated racks fixedly connected to the second gear and the third gear to clamp the steel wire, thus improving the quality and strength of net repair.

Optionally, the open-frame underwater robot includes a connecting frame, and a main controller is arranged in a middle of the connecting frame, two sides of the connecting frame are respectively provided with horizontal plates and vertical plates, the horizontal plates on both sides are symmetrically arranged with respect to the main controller, the horizontal plates are provided with vertical propellers, horizontal propellers are fixedly arranged on both sides of the main controller, and the horizontal propellers are arranged at an angle with the vertical plates. The open-frame underwater robot effectively controls the repairing mechanism of deep-water cage nets and a movement track of the open-frame underwater robot is a movement track of the repairing mechanism of the deep-water cage nets. There are four sets of horizontal propellers and vertical propellers respectively, which not only provide enough power for the activities of the device, but also realize a dynamic stability of the device in complex deep water areas, thus improving the repair quality of nets.

Optionally, the main controller includes an electric control mechanism for controlling the vertical propellers and the horizontal propellers to move, a power supply for supplying energy and a camera for observation, where the main controller is electrically connected with the control box, the camera (similar to eyes of the device) is used to locate a position of a cage net to be repaired in deep water, realize the pathfinding function, and also observe a hole breaking of the net, observe the repairing situation in real time, and improve the practicability of the device.

Optionally, a bottom of the open-frame underwater robot is fixedly connected with a connecting block, and the connecting block is slidably connected with the connecting shaft, where an inside of the connecting shaft has a hollow structure.

The application discloses that following technical effect.

When a large hole appears, the device drives two mechanical claws to increase the opening angle, and repairs the large hole in the net by combining with multiple repairs, thus avoiding the huge economic loss and biological environmental pollution caused by an escape of large-scale fish due to low manual diving efficiency. Moreover, the device has high realizability, safe and reliable operation, high portability, strong portability and high integration.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, features and advantages of the present application more obvious and understandable, the present application will be explained in further detail below with reference to the drawings and detailed description.

Embodiment 1

Figure 1:
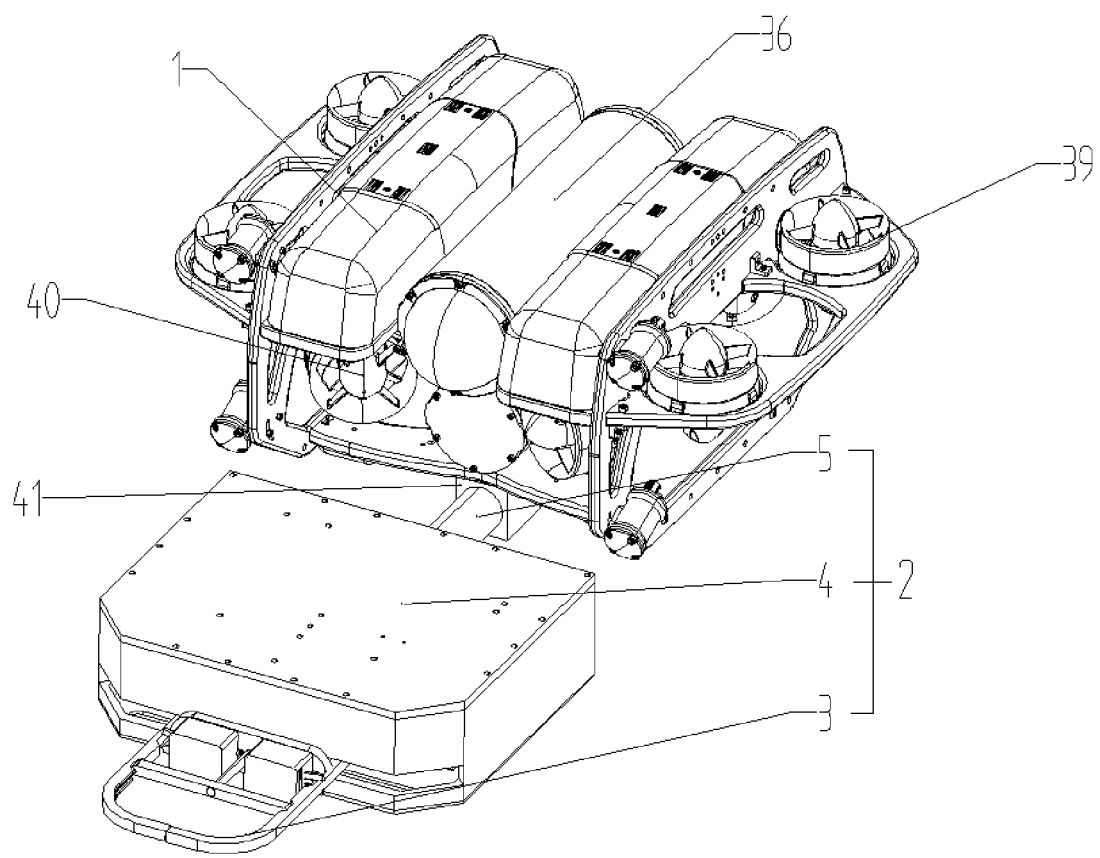
FIG. 1 is a schematic structural diagram of a device for repairing according to the present application.
Figure 2:
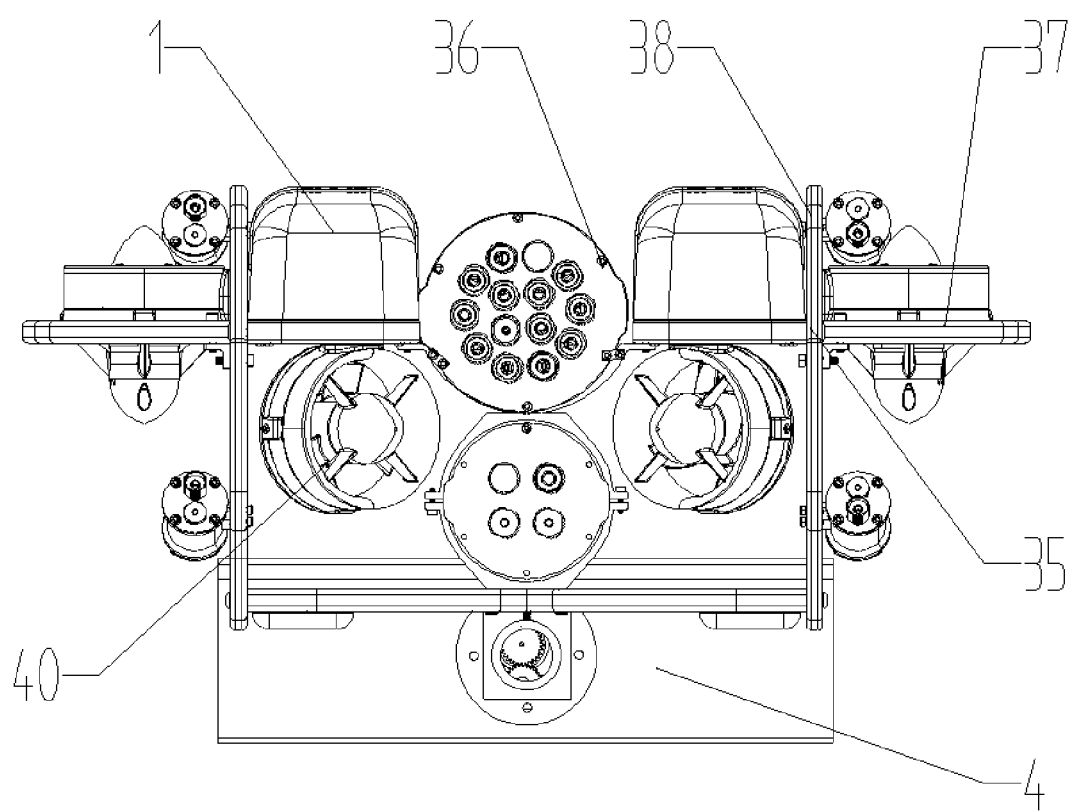
FIG. 2 is a rear view of a device for repairing according to the present application.
Figure 3:
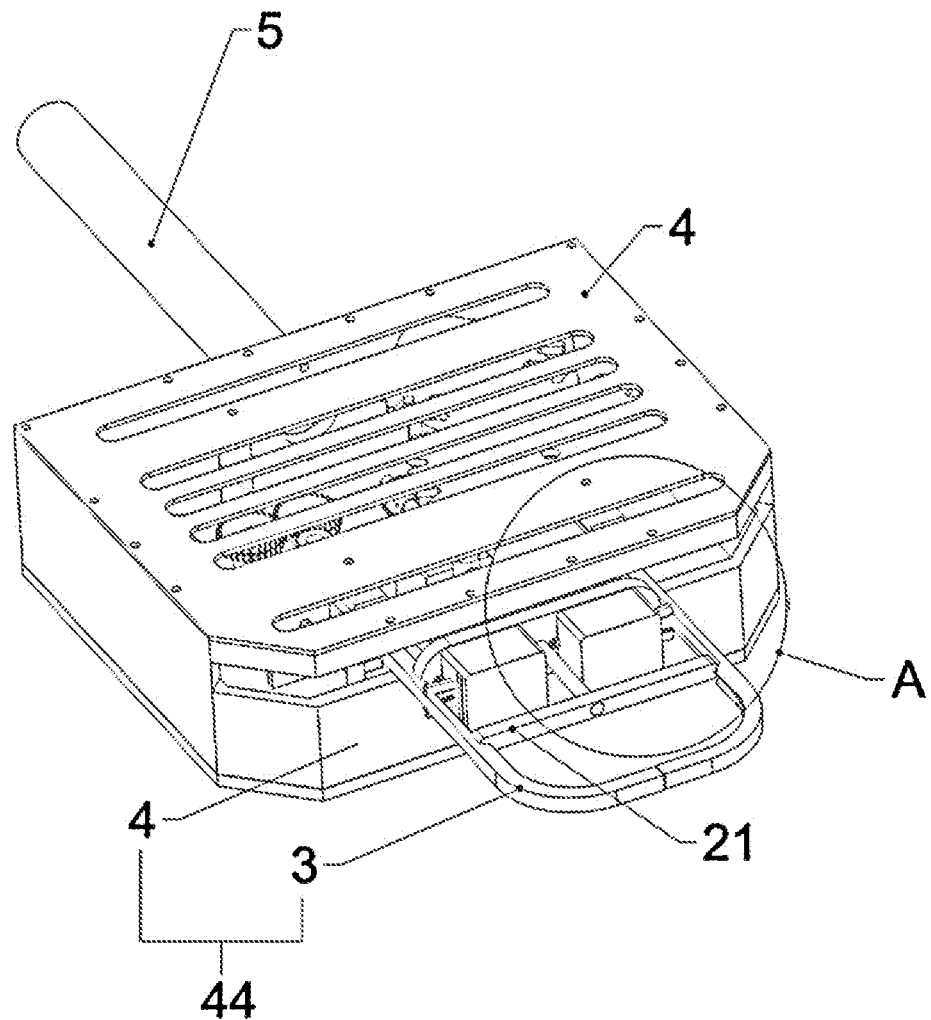
FIG. 3 is a structural schematic diagram of repairing mechanism of a deep-water cage net according to the present application.
Figure 4:
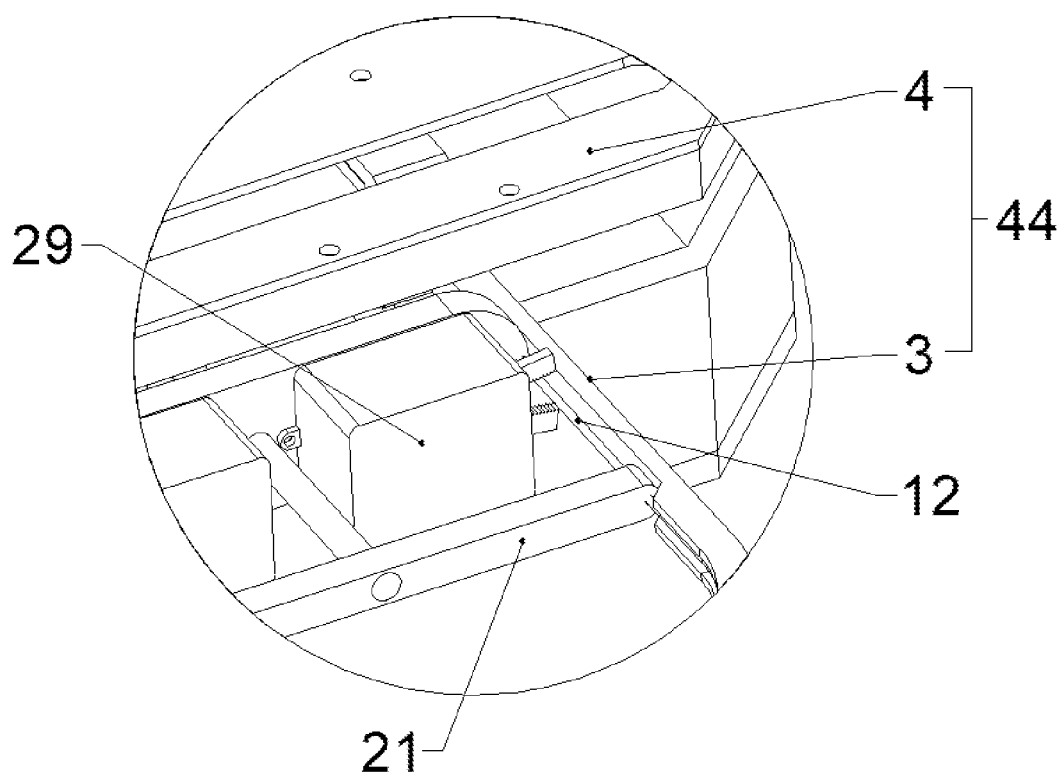
FIG. 4 is a partial enlarged view of A in the FIG. 3.
Figure 5:
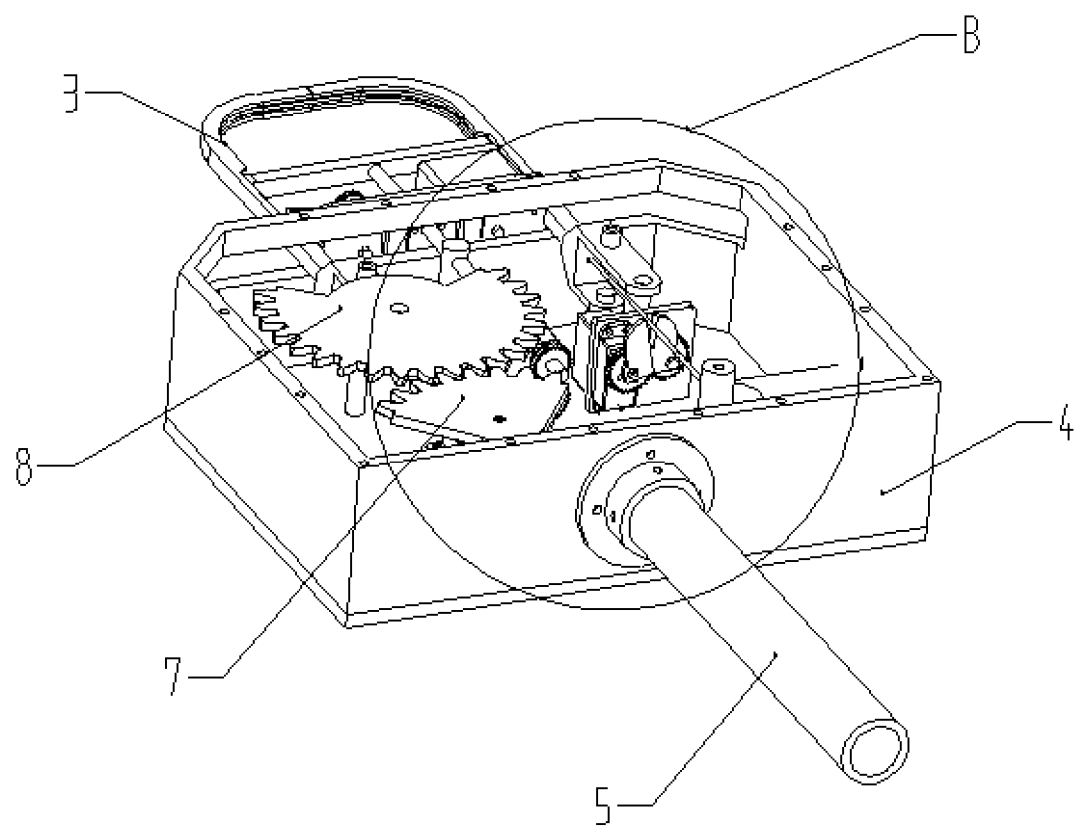
FIG. 5 is a schematic structural diagram of a steel wire cutting mechanism according to the present application.
Figure 6:
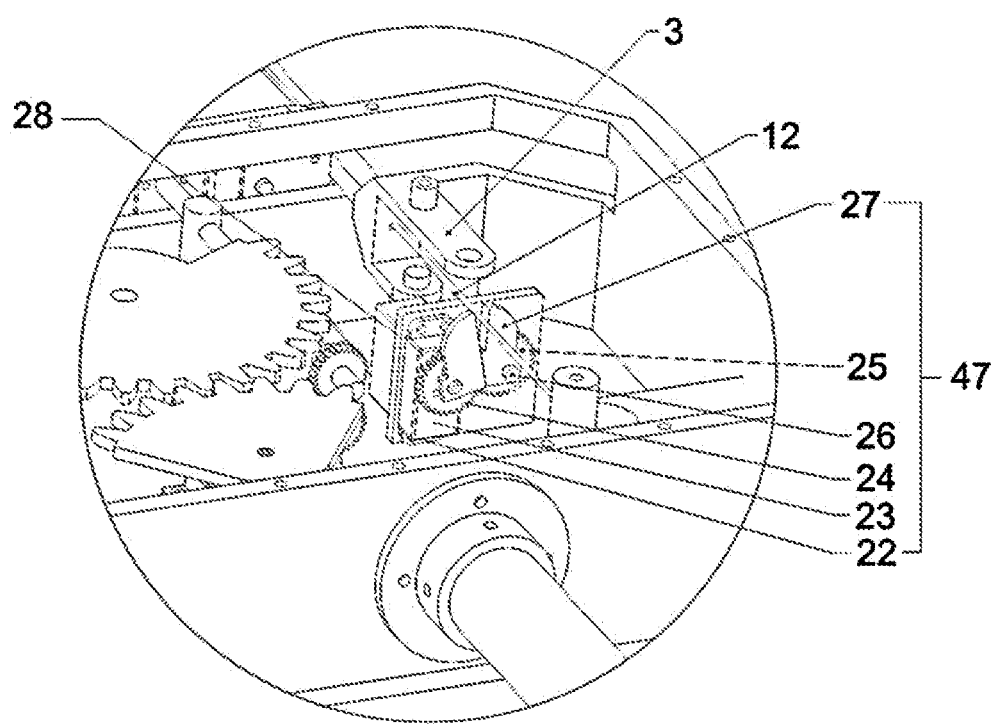
FIG. 6 a partial enlarged view of B in the FIG. 5.
Figure 7:
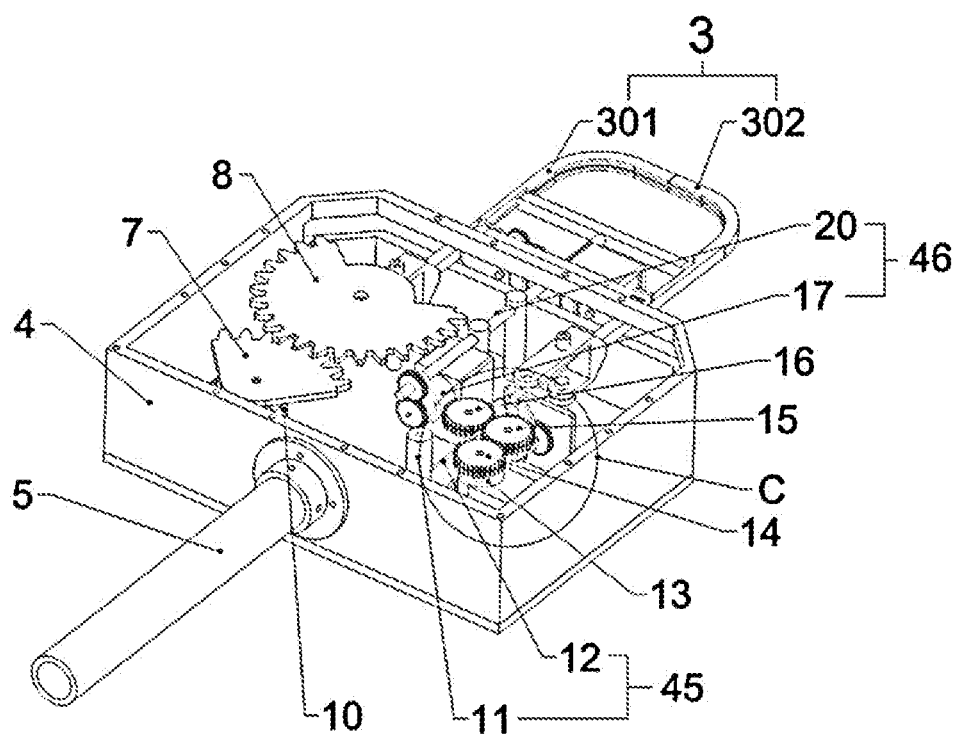
FIG. 7 is a schematic structural diagram of a wire feeding mechanism according to the present application.
Figure 8:
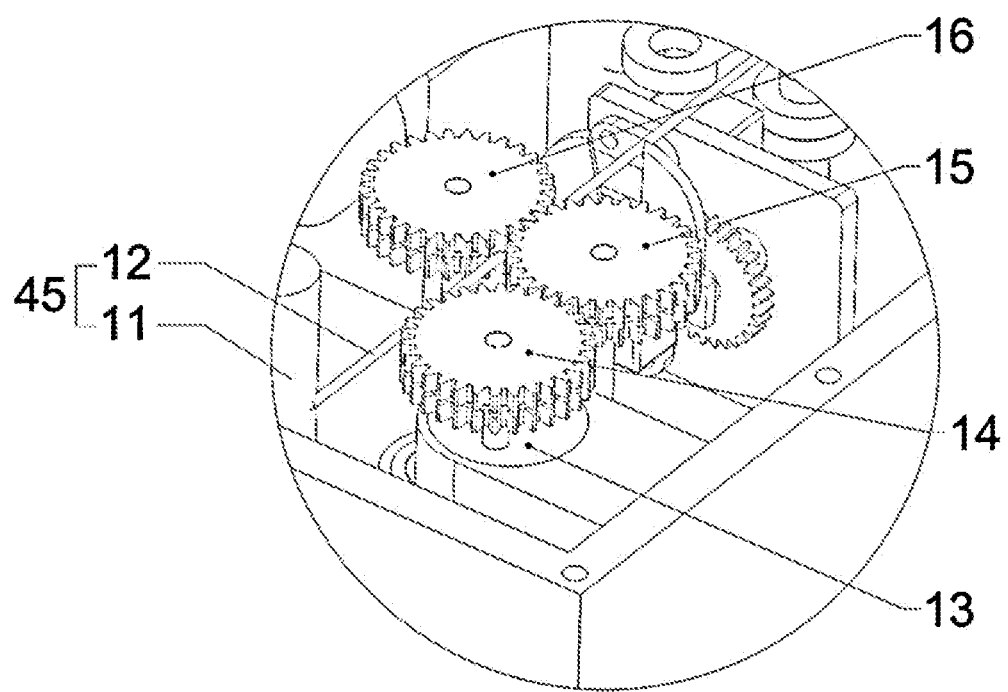
FIG. 8 is a partial enlarged view of C in the FIG. 7.
Figure 9:
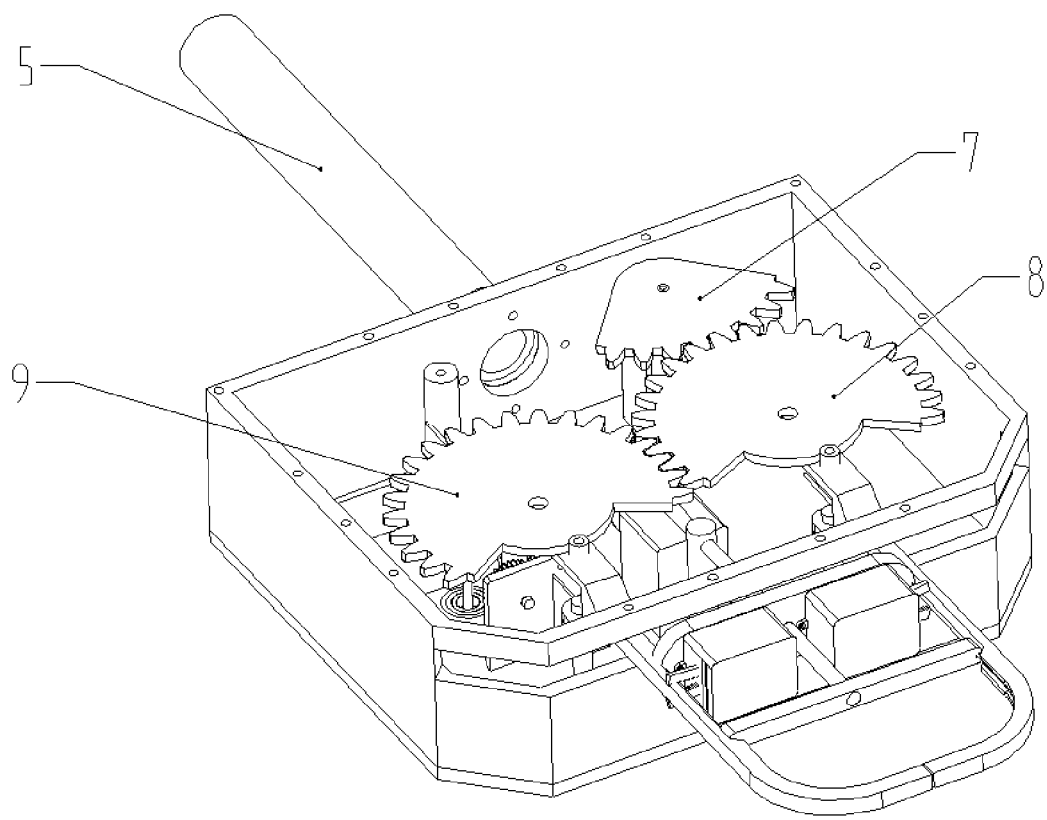
FIG. 9 is a schematic diagram of a sector gear according to the present application.
Figure 10:
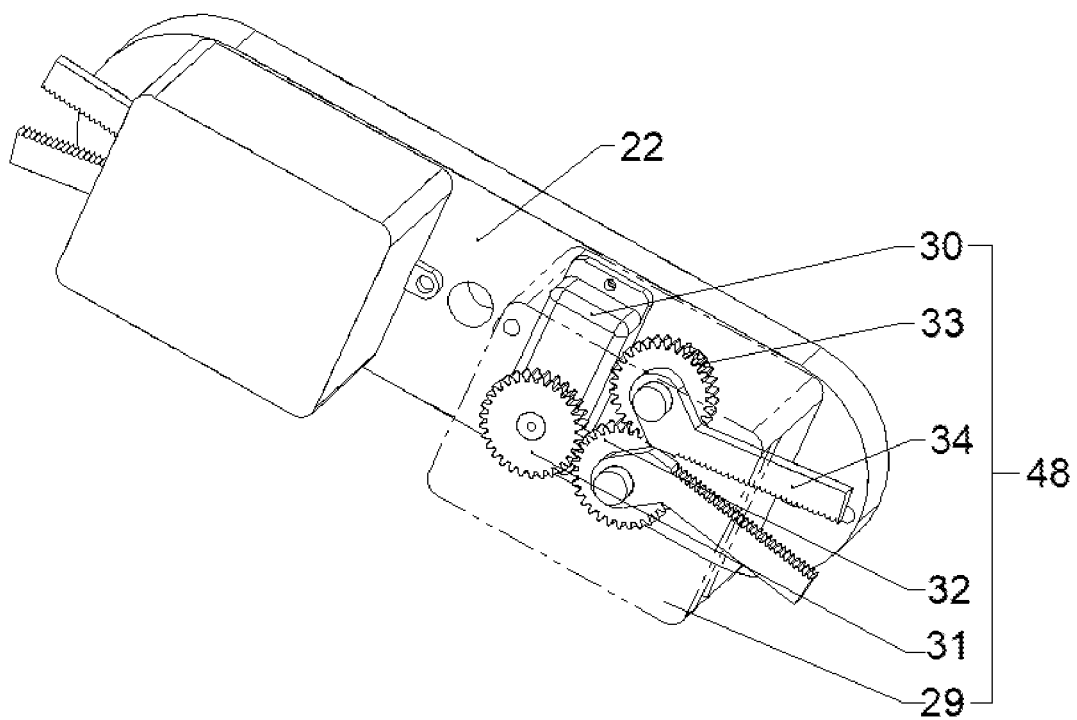
FIG. 10 is a structural schematic diagram of steel wire clamping mechanisms according to the present application.
Figure 11:
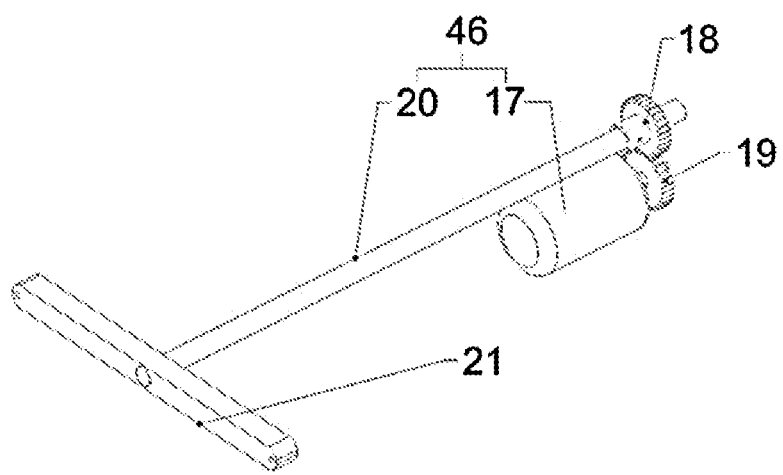
FIG. 11 is a structural schematic diagram of a rotary knotting mechanism according to the present application.
Figure 12:
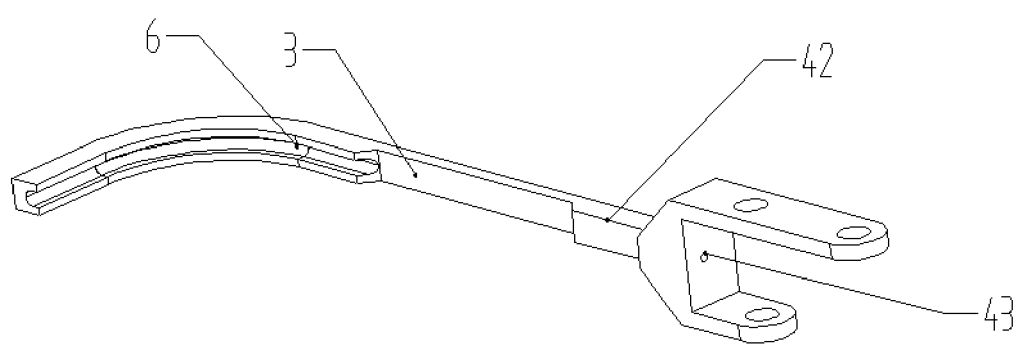
FIG. 12 is a schematic diagram of the mechanical claw structure of the present application.

Referring to FIGS. 1-12, a device for repairing deep-water cage nets comprises an open-frame underwater robot 1 and a repairing mechanism 2 of deep-water cage nets, where the repairing mechanism 2 of deep-water cage nets comprises a hole penetrating mechanism 44, a wire feeding mechanism 45, a rotary knotting mechanism 46, a wire cutting mechanism 47 and a wire clamping mechanism 48.

The hole penetrating mechanism 44 includes mechanical claws 3 and a control box 4 for controlling the mechanical claws 3. The wire feeding mechanism 45 and the steel wire cutting mechanism 47 are both fixedly arranged in the control box 4, and the wire clamping mechanisms 48 and the rotary knotting mechanism 46 are both arranged between two mechanical claws 3.

Deep-water cage nets with holes are effectively repaired through a cooperation between the open-frame underwater robot 1 and the repairing mechanism 2 of deep-water cage nets. Moreover, the open-frame underwater robot 1 well overcomes the complex environment of the seabed and reduce risks when the robot is working, so that the device for repairing effectively replaces a conventional manual launching repairing mode, improves the repairing efficiency and ensure the personal safety. Secondly, the application uses modular assembly to assemble the open-frame underwater robot 1 and the repairing mechanism 2 of deep-water cage nets, which is not only convenient to disassemble and assemble the open-frame underwater robot 1 and the repairing mechanism 2, but also beneficial to transport the open-frame underwater robot 1 and the repairing mechanism 2, thus ensuring the safety of the device itself. In addition, the application organically combines net repairing and knotting, which not only speeds up the repairing efficiency, but also reduces parts of the repairing mechanism 2 of the deep-water cage nets, shortens the time for manufacturing the device and improves the practicability of the device.

There are two mechanical claws 3, two mechanical claws 3 respectively penetrate through a box body of the control box 4 and are connected to an outside of the control box 4, and an inner side of each mechanical claw 3 is provided with a U-shaped groove 6. A side wall of the control box 4 intersecting with the mechanical claws 3 is provided with a groove for two mechanical claws 3 to penetrate through the side wall of the box body, and a length of the groove is slightly smaller than that of the side wall of the control box 4, so as to provide enough space for the two mechanical claws 3 to move, repair holes with different areas and improve the practicability of the device. The two mechanical claws 3 are a first mechanical claw 301 and a second mechanical claw 302, respectively. A lever arm 42 of the first mechanical claw 301 located inside the control box 4 is fixedly connected with a first sector gear 7, and the first sector gear 7 meshes with a second sector gear 8. A lever arm 42 of the second mechanical claw 302 located inside the control box 4 is fixedly connected with a third sector gear 9, and the second sector gear 8 meshes with the third sector gear 9 each other. The first sector gear 7 is fixedly connected with a fully waterproof steering gear 10 and the fully waterproof steering gear 10 is fixedly connected to an inner wall of the control box 4. A tail of each mechanical claw 3 is a horizontal V-shaped bracket, and each horizontal V-shaped bracket is sleeved on respective fixing column inside the control box 4 to stabilize the mechanical claws 3, so that the mechanical claws 3 rotate along the fixing columns. The first mechanical claw 301 and the second mechanical claw 302 are respectively connected with their respective fixing columns, and fixing columns penetrate through holes near middle positions of mechanical claws, and are fixedly connected with side faces of the second sector gear 8 and the third sector gear 9 respectively at the end positions of the lever arms 42 of mechanical claws 3. As the second sector gear 8 and the third sector gear 9 are meshed with each other, when the first sector gear 7 is meshed with the other two sector gears, the first mechanical claw 301 and the second mechanical claw 302 are kept close to each other or away from each other, thus improving the intelligence of the device. The first sector gear 7, the second sector gear 8 and the third sector gear 9 are all arranged near a top of the box body, and they are located in the plane. The first sector gear 7 is driven by the first fully waterproof steering gear 10, and only the first fully waterproof steering gear 10 needs to be controlled to rotate back and forth. The second sector gear 8 and the third sector gear 9 have a same shape and are symmetrical about a center line of the control box 4, and an arc angle of the third sector gear 9 is smaller than that of the first sector gear 7.

The wire feeding mechanism 45 includes a steel wire shaft 11 and a steel wire 12 wound on the steel wire shaft 11. One side of the steel wire shaft 11 is provided with a first submersible motor 13, the first submersible motor 13 is fixedly connected with an inside of the control box 4. The first submersible motor 13 is coaxially and fixedly connected with a first wire feeding gear 14, the first the wire feeding gear 14 is in close contact with the steel wire 12. The first wire feeding gear 14 meshes with a second wire feeding gear 15, and the second wire feeding gear 15 meshes with a third wire feeding gear 16. The second wire feeding gear 15 and the third wire feeding gear 16 are located on both sides of the steel wire 12 and are symmetrically arranged with respect to the steel wire 12. The specifications of the three wire feeding gears are the same, a middle of each wire feeding gear is provided with a groove along an circumferential direction of the gear itself, a shape of each groove is matched with a shape of the steel wire 12, and when in use, a running direction of the steel wire 12 are effectively controlled, and the second wire feeding gear 15 is arranged correspondingly to the first wire feeding gear 14, and the second wire feeding gear 15 and the first wire feeding gear 14 are closely meshed, so that the steel wire 12 is tightly clamped through the extrusion force of engagement between two gears and pulled out along with the rotation of the gears, thereby realizing fast coming-out of wire and improving the practicability of the device. Moreover, the second wire feeding gear 15 and the third wire feeding gear 16 press a bent part of the steel wire 12 straight, thus ensuring that the steel wire 12 is not stuck when being pulled out.

The rotary knotting mechanism 46 includes a second submersible motor 17, a first cylindric straight-teeth gear 18 connected to the second submersible motor 17 and a second cylindric straight-teeth gear 19 connected to a rotating shaft 20. The first cylindric straight-teeth gear 18 and the second cylindric straight-teeth gear 19 mesh with each other, and the second submersible motor 17 meshes with the rotating shaft 20 through two groups of straight-teeth gears. One side of the rotating shaft 20 far away from the second submersible motor 17 is fixedly connected by an intercepting plate 21. Two ends of the intercepting plate 21 are provided with through holes for threading the steel wire 12, the intercepting plate 21 is located outside the control box 4 and between the mechanical claws 3, the through holes correspond to the cross sections of the U-shaped grooves 6, and the mechanical claws 3 are provided with grooves for the intercepting plate 21 to move. When knotting is required, the second submersible motor 17 drives the intercepting plate 21 to rotate and tighten the two broken steel wires 12. The intercepting plate 21 is arranged near the end of the mechanical claws 3 to ensure that the tightening part of the steel wire 12 is not too long, which not only saves the steel wire 12, but also prevents a knotting part from being too large to affect the survival of fish.

The steel wire cutting mechanism 47 is fixedly arranged at one side of the wire feeding mechanism 45 in a wire outlet direction, and the steel wire cutting mechanism 47 includes a fixed plate 22 fixedly connected with the inner wall of the control box 4, the fixed plate 22 is fixedly connected with a second fully waterproof steering gear 23, the second fully waterproof steering gear 23, is coaxially and fixedly connected with a first straight-teeth gear 24, the first straight-teeth gear 24 is meshed with a second straight-teeth gear 25, the second straight-teeth gear 25 is connected to the fixed plate 22 by a fixed rod 26, the first straight-teeth gear 24 and the second straight-teeth gear 25 are fixedly connected with blades 27 respectively, and two blades 27 are hinged and matched with each other. The wire cutting mechanism 47 is arranged close to the second wire feeding gear, and cuts the wire 12 from a root of the second wire feeding gear when a wire feeding is stopped, so as to prevent the intercepting plate 21 from pulling out too much wire 12 during knotting, thus causing the waste of the wire 12. Moreover, a broken steel wire 12 at one end of the steel wire cutting mechanism 47 far away from the wire feeding gear is also be used for knotting, so that the steel wire 12 is effectively utilized and unnecessary waste can be avoided.

There are two sets of wire clamping mechanisms 48, two sets of wire clamping mechanisms 48 are symmetrically arranged about the center line of the control box 4. Both sets of wire clamping mechanisms 48 are arranged on a bottom plate 28, and each set of wire clamping mechanisms 48 includes a sealing protective shell 29. One side of the sealing protective shell 29 near the bottom plate 28 is fixedly connected with a mini steering gear 30, the mini steering gear 30 is coaxially and fixedly connected with a first gear 31. The first gear 31 meshes with a second gear 32, the second gear 32 meshes with a third gear 33, and the third gear 33 and the second gear 32 are longitudinally arranged in parallel. The third gear 33 and the second gear 32 are both fixedly connected with serrated racks 34, and the serrations on the two groups of serrated racks 34 are correspondingly arranged. The ends of the two groups of serrated racks 34 correspond to the U-shaped grooves 6. The mechanical claws 3 are provided with grooves for the serrated racks 34 to move. By driving the mini steering gear 30, the first gear 31 is driven, and the first gear 31 meshes with the second gear 32, the second gear 32 meshes with the third gear 33, and then drives the serrated racks 34 fixedly connected to the second gear 32 and the third gear 33 to clamp the steel wire 12, thus improving the quality and strength of mesh repair.

The open-frame underwater robot 1 is detachably connected with the repairing mechanism 2 of the deep-water cage nets through a connecting shaft 5. The open-frame underwater robot 1 includes a connecting frame 35, and a main controller 36 is arranged in a middle of the connecting frame 35. The two sides of the connecting frame 35 are respectively provided with horizontal plates 37 and vertical plates 38, the horizontal plates 37 on both sides are symmetrically arranged with respect to the main controller 36, the horizontal plates are provided with vertical propellers 39 and horizontal propellers 40 are fixedly provided on both sides of the main controller 36, and the horizontal propellers 40 are arranged at an angle with the vertical plates 38. The open-frame underwater robot 1 effectively control the repairing mechanism 2 of deep-water cage nets. The main controller 36 includes an electric control mechanism for controlling the movement of the vertical propellers 39 and the horizontal propellers 40, a power supply for supplying energy, and a camera for observation. The camera (similar to the eyes of the device) is used to find a position of a cage net to be repaired in deep water, realize a pathfinding function, and also observe the hole condition of the net, observe the repairing situation in real time, and improve the practicability of the device. A movement track of the open-frame underwater robot 1 is a movement track of the repairing mechanism 2 of the deep-water cage nets. There are four sets of horizontal propellers 40 and vertical propellers 39 respectively, which not only provides enough power for the activities of the device, but also realizes the dynamic stability of the device in complex deep water areas, thus improving the repair quality of nets. A connecting block 41 is fixedly connected to a bottom of the open-frame underwater robot 1, and the connecting block 41 is slidably connected with the connecting shaft 5.

Working process: when working, the open-frame underwater robot 1 takes the repairing mechanism 2 of the deep-water cage nets into the water, travels to the deep-water cage nets for cruise monitoring of the underwater cage nets, and checks the damage of the cage nets through the camera. When a hole is found in the nets, the open-frame underwater robot 1 travels to the hole in the nets, and the opening angle of the mechanical claws 3 is determined by identifying the area of the hole. After the opening angle is determined, the open-frame underwater robot 1 drives the steering gears to drive the third sector gear 9 to rotate, thereby driving the first mechanical claw 301 fixedly connected with the first sector gear 7 to rotate. The first sector gear 7 drives the second mechanical claw 302 to open at a certain angle by meshing with the second sector gear 8 and then the open-frame underwater robot 1 drives the propellers to lean forward, so that the mechanical claws 3 enter the grid around the hole, and then the open-frame underwater robot 1 drives the hole penetrating mechanism 44, and the first mechanical claw 301 and the second mechanical claw 302 are closed. After the first mechanical claw 301 and the second mechanical claw 302 penetrate the mesh and close, the open-frame underwater robot 1 starts to drive the first submersible motor 13 to rotate. As the first wire feeding gear 14 fixed on the submersible motor is meshed with the second wire feeding gear 15, and the second wire feeding gear 15 is meshed with the third wire feeding gear 16, and a size and a distance between the second wire feeding gear 15 and the third wire feeding gear 16 have been designed according to the cross-sectional diameter of the steel wire 12, and the steel wire 12 is clamped when gears are rotating, thus driving the steel wire 12 forward. When the first submersible motor 13 rotates, the first wire feeding gear 14 drives the second wire feeding gear 15 and the third wire feeding gear 16 to rotate, so that the steel wire 12 is driven to move forward and enter the designed hole groove of the second mechanical claw 302. When the steel wire 12 keeps moving forward according to the predetermined hole groove, it passes through the a hollow groove of the designed rotating shaft 20 at the same time, then enters the U-shaped grooves 6 and keeps moving forward, and then pass through a second hollow groove of the rotating shaft 20, and then pass through a hole groove of the first mechanical claw 301, steel wire clamping mechanisms clamp the steel wire tightly, the first mechanical claw 301 and the second mechanical claw 302 are retracted, and a wire feeding process is completed.

After the wire feeding process is completed, a cutting process of the steel wire 12 is performed immediately. The Two cutting blades are fixed together with the gears by bolts, and a tangency dislocation is formed by bosses of the blades themselves, while the two gears mesh with each other. By driving the steering gears, the two blades are tangent, and then the stainless steel wire 12 between the two blades is cut.

The second submersible motor 17 is driven, the first cylindric straight-teeth gear 18 is fixed on the second submersible motor 17, and the second cylindric straight-teeth gear 19 meshed with the first cylindric straight-teeth gear 18 is fixed on the rotating shaft 20. When the second submersible motor 17 is driven, the two gears drive the rotating shaft 20 to rotate. At this time, the steel wire 12 has passed through the two hollow grooves of the rotating shaft 20, and a rotation of the rotating shaft 20 drives a rotation of the steel wire 12 to knot. When the steel wire 12 rotates to a certain extent, the clamping mechanisms are driven to relax and release the steel wire 12. At this time, a hole in a net is repaired. After that, a clamping process of the steel wire 12 is carried out. By driving the mini steering gear 30, the first gear 31 is driven, and the first gear 31 meshes with the second gear 32, the second gear 32 meshes with the third gear 33, and then the serrated racks 34 fixedly connected to the second gear 32 and the third gear are driven to clamp the steel wire 12, thus improving the quality and strength of net repair.

Embodiment 2

The embodiment provides a device for repairing deep-water cage nets. Differences between this embodiment and Embodiment 1 are that the open-frame underwater robot 1 is movably connected with the deep-water cage nets, the connecting shaft 5 slides or rotates inside the connecting block 41. At this time, when the open-frame underwater robot 1 is started up, it only plays a role in diving and transporting the repairing mechanism 2 of the deep-water cage nets and stabilizing the whole device dynamically, while all kinds of movement modes required by the mechanical claws 3 when repairing is carried out are realized by the sliding and rotating of the connecting rod inside the connecting block 41, which not only effectively reduce the movement of the open-frame underwater robot 1, reduce the power consumption and effectively prolong the working time of the repairing device, but also speeds up the repair process, reduce the influence of complex undercurrent, and improve the practicability of the device.

In the description of the present application, it should be noted that the orientations or position relationships indicated by the terms "longitudinal", "transverse", "upper", "lower", "front", "rear", "left", "right", "vertical", "horizontal", "top", "bottom", "inner", "outer" are based on the orientations or position relationships shown in the figures, which are only for the convenience of describing the present application, rather than indicating or implying that the device or elements must be in designated orientation, or configured or operated in designated orientation so that they cannot be understood as the limitation of this application.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A device for repairing deep-water cage nets, comprising an open-frame underwater robot and a repairing mechanism of deep-water cage nets, wherein the repairing mechanism of deep-water cage nets comprises a hole penetrating mechanism, a wire feeding mechanism, a rotary knotting mechanism, a steel wire cutting mechanism and steel wire clamping mechanisms;

wherein the hole penetrating mechanism comprises mechanical claws and a control box for controlling the mechanical claws, the wire feeding mechanism and the steel wire cutting mechanism are both fixedly arranged in the control box, and the steel wire clamping mechanisms and the rotary knotting mechanism are both arranged between two mechanical claws outside the control box; wherein there are two mechanical claws, the two mechanical claws respectively penetrate through a box body of the control box, and the inner sides of the two mechanical claws are provided with U-shaped grooves;

the rotary knotting mechanism comprises a second submersible motor and a rotating shaft, a first cylindric straight-teeth gear connected to the second submersible motor, and a second cylindric straight-teeth gear connected to the rotating shaft, wherein the first cylindric straight-teeth gear and the second cylindric straight-teeth gear are meshed with each other; one side of the rotating shaft far away from the second submersible motor is fixedly connected with an intercepting plate, two ends of the intercepting plate are provided with through holes for threading a steel wire, the intercepting plate is located outside the control box and between the mechanical claws, the through holes correspond to cross sections of the U-shaped grooves, and the mechanical claws are provided with grooves for the intercepting plate to move; and wherein the open-frame underwater robot is detachably connected with the repairing mechanism of deep-water cage nets through a connecting shaft.

2. The device for repairing deep-water cage nets according to claim 1, wherein the two mechanical claws are a first mechanical claw and a second mechanical claw respectively, a lever arm of the first mechanical claw located inside the control box is fixedly connected with a first sector gear, the first sector gear is meshed with a second sector gear, a lever arm of the second mechanical claw located inside the control box is fixedly connected with a third sector gear, and the second sector gear and the third sector gear are mutually meshed; the first sector gear is fixedly connected with a fully waterproof steering gear, and the fully waterproof steering gear is fixedly connected to an inner wall of the control box.

3. The device for repairing deep-water cage nets according to claim 2, wherein the second sector gear and the third sector gear have a same shape and are symmetrical about a center line of the control box, and an arc angle of the first sector gear is smaller than that of the second sector gear.

4. The device for repairing deep-water cage nets according to claim 1, wherein the wire feeding mechanism comprises a steel wire shaft and the steel wire wound on the steel wire shaft, wherein one side of the steel wire shaft is provided with a first submersible motor, the first submersible motor is fixedly connected with an inside of the control box, the first submersible motor is coaxially and fixedly connected with a first wire feeding gear, the first wire feeding gear in close contact with the steel wire, the first wire feeding gear is meshed with a second wire feeding gear, the second wire feeding gear is meshed with a third wire feeding gear and the second wire feeding gear and the third wire feeding gear are located on both sides of the steel wire and are symmetrically arranged with respect to the steel wire.

5. The device for repairing deep-water cage nets according to claim 1, wherein the steel wire cutting mechanism is fixedly arranged at one side of the wire feeding mechanism in a wire outlet direction, and the steel wire cutting mechanism comprises a fixed plate fixedly connected with the inner wall of the control box, and the fixed plate is fixedly connected with a second fully waterproof steering gear, the second fully waterproof steering gear is coaxially and fixedly connected with a first straight-teeth gear, the first straight-teeth gear is meshed with a second straight-teeth gear, the second straight-teeth gear is connected to the fixed plate through a fixed rod, blades are fixedly connected to the first straight-teeth gear and the second straight-teeth gear respectively and two blades are hinged with each other and are matched with each other.

6. The device for repairing deep-water cage nets according to claim 2, wherein there are two sets of steel wire clamping mechanisms, two sets of steel wire clamping mechanisms are symmetrically arranged about the center line of the control box, and both sets of steel wire clamping mechanisms are arranged on a bottom plate, and each set of steel wire clamping mechanisms comprises a sealing protective shell, and one side of an inside of the sealing protective shell close to the bottom plate is fixedly connected with a mini steering gear; the mini steering gear is coaxially and fixedly connected with a first gear, the first gear is meshed with a second gear, the second gear is meshed with a third gear, and the third gear and the second gear are longitudinally arranged in parallel; the third gear and the second gear are both fixedly connected with serrated racks, and serrations on the two groups of serrated racks are correspondingly arranged; ends of the two groups of serrated racks correspond to the U-shaped grooves; the mechanical claws are provided with grooves for the serrated racks to move.

7. The device for repairing deep-water cage nets according to claim 1, wherein the open-frame underwater robot comprises a connecting frame, and a main controller is arranged in a middle of the connecting frame; two sides of the connecting frame are respectively provided with horizontal plates and vertical plates, the horizontal plates on both sides are symmetrically arranged with respect to the main controller, the horizontal plates are provided with vertical propellers, horizontal propellers are fixedly arranged on both sides of the main controller, and the horizontal propellers are arranged at an angle with the vertical plates.

8. The device for repairing deep-water cage nets according to claim 7, wherein the main controller comprises an electric control mechanism for controlling the vertical propellers and the horizontal propellers to move, a power supply for supplying energy and a camera for observation, wherein the main controller is electrically connected with the control box.

9. The device for repairing deep-water cage nets according to claim 8, wherein a bottom of the open-frame underwater robot is fixedly connected with a connecting block, the connecting block is slidably connected with the connecting shaft, and an inside of the connecting shaft has a hollow structure.

* * * * *